(12) United States Patent
Jody et al.

(10) Patent No.: US 7,525,010 B2
(45) Date of Patent: Apr. 28, 2009

(54) PROCESS TO WASH POLYMERS CONTAMINATED WITH POLYCHLORINATED BIPHENYLS (PCBS)

(75) Inventors: Bassam J. Jody, Tinley Park, IL (US); Joseph A. Pomykala, Jr., Shorewood, IL (US); Edward J. Daniels, Orland Park, IL (US); Jeffrey S. Spangenberger, Plainfield, IL (US)

(73) Assignee: UChicago Argonne LLC, Chicago, IL (US)

( * ) Notice: Subject to any disclaimer, the term of this patent is extended or adjusted under 35 U.S.C. 154(b) by 248 days.

(21) Appl. No.: 11/590,511

(22) Filed: Oct. 31, 2006

(65) Prior Publication Data

US 2008/0103347 A1    May 1, 2008

(51) Int. Cl.
*A62D 3/34* (2007.01)
*B08B 7/00* (2006.01)
*B08B 5/04* (2006.01)
*B08B 3/00* (2006.01)

(52) U.S. Cl. ........................... 588/316; 134/19; 134/21; 134/105

(58) Field of Classification Search ................. 588/316; 134/19, 21, 105
See application file for complete search history.

(56) References Cited

U.S. PATENT DOCUMENTS

| 4,864,942 | A | * | 9/1989 | Fochtman et al. ........... 110/226 |
| 5,330,618 | A | | 7/1994 | Daniels et al. |
| 5,653,867 | A | | 8/1997 | Jody et al. |
| 5,882,432 | A | | 3/1999 | Jody et al. |
| 6,329,436 | B1 | | 12/2001 | Jody et al. |
| 6,423,151 | B1 | * | 7/2002 | Gonzalez et al. .............. 134/10 |
| 6,599,950 | B2 | | 7/2003 | Jody et al. |
| 6,749,816 | B1 | * | 6/2004 | Hasegawa et al. ........... 422/189 |

FOREIGN PATENT DOCUMENTS

JP        2003236492 A   *   8/2003

\* cited by examiner

*Primary Examiner*—Timothy C Vanoy
*Assistant Examiner*—Daniel Berns
(74) *Attorney, Agent, or Firm*—Joan Pennington

(57) ABSTRACT

A process of washing plastics contaminated with polychlorinated biphenyls (PCBs) is provided to reduce the concentration of the PCBs. A two-step process includes a first washing step using a selected washing solution or solvent, such as, a non-flammable solvent, and followed by a second step using thermal desorption. The two-step process enables reducing the concentration of PCBs in polymers, such as recovered from shredder residue, for example, to as low as 0.253 PPM. One of the preferred solvents is Perchloroethylene.

20 Claims, 2 Drawing Sheets

PROCESS TO WASH POLYMERS CONTAMINATED WITH POLYCHLORINATED BIPHENYLS (PCBS)

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a process of washing plastics contaminated with polychlorinated biphenyls (PCBs) to reduce the concentration of the PCBs.

DESCRIPTION OF THE RELATED ART

Scrap plastics that could be recovered from shredder residue, home appliances, electronics and other plastics-containing waste streams are generally contaminated with oils, dirt, glass, metals and other materials. These plastics are also generally not compatible with each other and therefore, must be separated from each other with high purity.

In some cases, such as shredder residue, these plastics may also be contaminated with polychlorinated biphenyls PCBs and the PCBs concentration has to be reduced to below 2 PPM before the plastics can be introduced into commerce.

A need exists for an effective process to clean and purify plastics contaminated with polychlorinated biphenyls (PCBs) and to reduce the PCBs concentration to below 2 PPM.

A principal aspect of the present invention is to provide a process of washing plastics contaminated with polychlorinated biphenyls (PCBs).

A primary aspect of this process is to clean the plastics so that the plastics can be introduced into commerce, having a PCBs content less than 2 PPM.

Other important aspects of the present invention are to provide such a process of washing plastics contaminated with polychlorinated biphenyls (PCBS) substantially without negative effect and that overcome some of the disadvantages of prior art arrangements.

SUMMARY OF THE INVENTION

In brief, a process of washing plastics contaminated with polychlorinated biphenyls (PCBS) is provided to reduce the concentration of the PCBs. A two-step process includes first a washing step using a selected washing solution or solvent, such as, a non-flammable solvent, and followed by a second step using thermal desorption.

In accordance with features of the invention, the two-step process enables reducing the concentration of PCBs in polymers, such as recovered from shredder residue, for example, to as low as 0.253 PPM. The washing step removes oils, other automotive fluids, grease and dirt, One of the preferred solvents is Perchloroethylene (Perc), a non-flammable solvent that is widely used in the dry cleaning industry. Perchloroethylene has the added benefits that at the right operating conditions, Perchloroethylene can also selectively dissolve some of the plastics so they could be recovered from the plastics mixture at high purity. Dissolution of some of these plastics from the mixture also leaves behind a purer product.

In accordance with features of the invention, the first washing step provides effective removal of oils, grease and dirt using a selected washing solution such as, $H_2O_2$ or a solvent, such as, Perchloroethylene or hexane.

In accordance with features of the invention, the second thermal desorption step is a process taking place at a predefined temperature below the temperature that may cause degradation of the properties of the material being cleaned. The selected temperature depends on the type of washing media used and the type of materials being cleaned. For example, for cleaning polyethylene and polypropylene a temperature of or below 250° C. is used under a moderate vacuum. Also an inert gas environment can be advantageously used to prevent oxidation or degradation of the materials being cleaned and to facilitate removal of the desorbing gases and vapors. Steam can also be used and it will serve as a heat source as well as a medium to remove the desorbing gases and vapors.

In accordance with features of the invention, with the first washing step a technique such as solvent exchange to remove the PCBs from the solution that contains the dissolved plastics and then precipitate the dissolved plastics to prevent recontamination of the dissolved plastics. Also a selective anti-solvent to precipitate the dissolved plastics while keeping the PCBs in solution can be used with the first washing step.

In accordance with features of the invention, the first washing step is provided for a selected time period, such as between about 5 minutes and about 60 minutes. The actual time depends on the types and levels of contamination on the plastics that are being cleaned.

In accordance with features of the invention, the second thermal desorption step is provided for a selected time period, such as between about 15 minutes and about 60 minutes, and administered at a preselected temperature and under an appropriate medium, such as vacuum or an inert gas. The actual process temperature, medium and time depend on the materials that are being cleaned.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a two-step process has been successfully tested at Argonne National Laboratory on the bench scale using a non-flammable solvent that is widely used in the dry cleaning industry, Perchloroethylene (Perc), followed by thermal desorption. In tests conducted at Argonne we were able to reduce the concentration of PCBs in polymers recovered from shredder residue to as low as 0.253 PPM. Perc has the added benefits that at the right operating conditions including temperature and time can also selectively dissolve some of the plastics so they could be recovered from the plastics mixture at high purity.

PCBs found on plastics recovered from shredder residue generally exist in two forms: (1) PCBs present in the oils and dirt that coats the plastics, and (2) PCBs adsorbed on the plastics.

In accordance with features of the invention, the process is a two-step process used to clean plastics contaminated with PCBs. First a washing solution or solvent is used to wash the plastics and remove the oils and the dirt that generally contains about 40%-80% of the PCBs and then the washed and rinsed plastics are treated at an elevated temperature, for example, under vacuum to desorb the adsorbed PCBs.

In accordance with features of the invention, the process enables cleaning the plastics so that they can be introduced into commerce, i.e. their PCBs content less than 2 PPM. Additional benefits include the selective dissolution of one or more of the plastics in the mixture for recovery as products. This will also leave behind a purer product. This renders the overall process more efficient and most likely more economical. Even though we used Perc in this process to clean the plastics and selectively recover the Polystyrene (PS) and Polyoxyphenylene (PPO) plastics, other solvents may be used to clean the plastics and selectively recover some of the other plastics. For example acetone can be used to wash the plastics and selectively dissolve ABS from some mixtures while tetrahydro furan can be used to wash and selectively dissolve PVC from other mixtures.

Therefore, it should be understood that the process of the invention is not limited to using the solvent Perchloroethylene (Perc). This process can also be applied for cleaning and purifying plastics-products recovered from different waste streams by other techniques such as conventional gravity separation, froth flotation or electrostatic separation or fractions there of. For example, the acrylonitrile butadiene styrene (ABS) product from shredder residue and home appliances may contain about 1%-10% by weight PS and PPO. This process can clean and separate the PS from the ABS to produce essentially 100% pure ABS and PS/PPO products.

Figure 1:
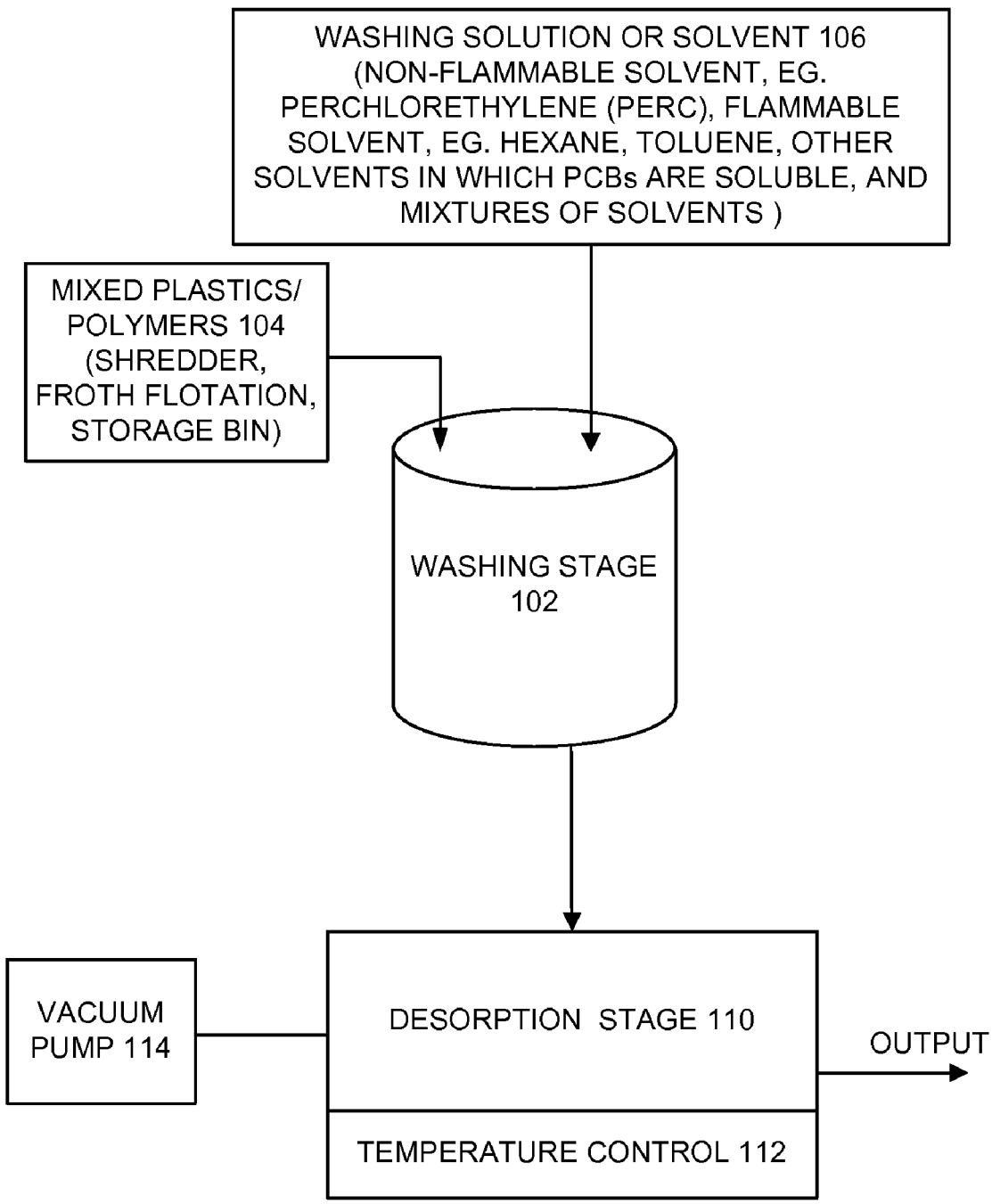
FIG. 1 is a schematic diagram representation illustrating a two stage system for washing plastics contaminated with polychlorinated biphenyls (PCBS) in accordance with the preferred embodiment.

Having reference now to the drawings, in FIG. 1 an exemplary apparatus generally designated by the reference character 100 for implementing methods for washing plastics contaminated with polychlorinated biphenyls (PCBs) is provided to reduce the concentration of the PCBs in accordance with the preferred embodiment. Apparatus 100 includes a washing stage 102 receiving mixed plastics/polymers contaminated with PCBs 104, for example, from a shedder, froth flotation process, or storage bin. A washing solution or solvent 106 is used in the first washing stage 102 to provide effective removal of oils, grease and dirt, for example, using a selected solvent washing solution such as, $H_2O_2$ or a solvent such as, Perchloroethylene or hexane, or other solvent.

Apparatus 100 includes a second desorption stage 110 receiving the washed plastics from the first washing stage 102. A temperature control 112 provided with the second thermal desorption stage provides a predefined temperature below the temperature that may cause degradation of the properties of the material being cleaned for the desorption process. For example, for cleaning polyethylene and polypropylene a temperature of or below 250° C. is used under a moderate vacuum provided by a vacuum pump 114.

In accordance with features of the invention, an inert gas environment can be advantageously used to prevent oxidation of the plastics when heated and to facilitate removal of the desorbing gases and vapors. Steam advantageously can also be used for the desorption process. Steam can serve as a heat source as well as a carrier medium to remove the desorbing gases and vapors.

Figure 2:
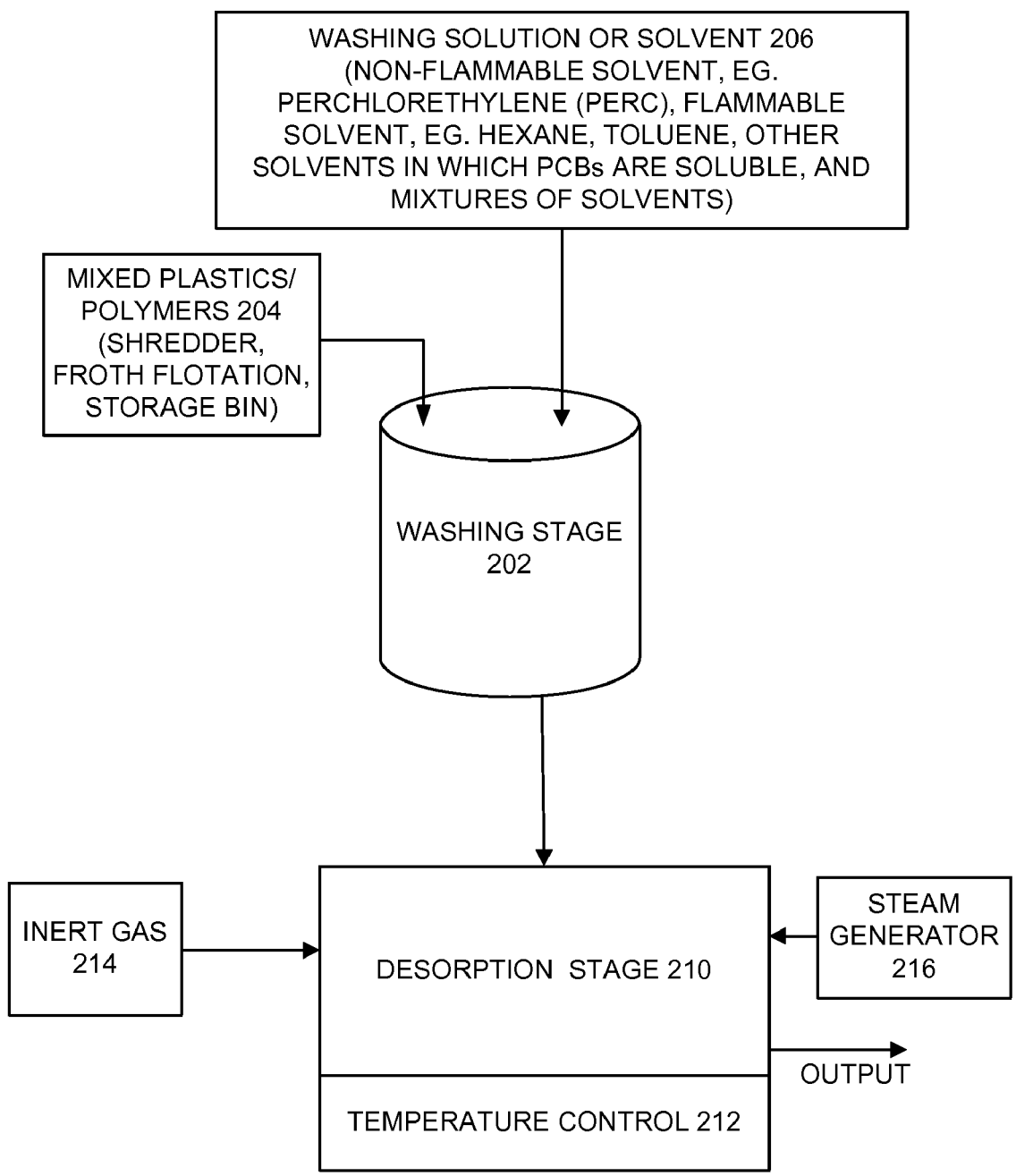
FIG. 2 is a schematic diagram representation illustrating an alternative two stage system for washing plastics contaminated with polychlorinated biphenyls (PCBS) in accordance with the preferred embodiment.

Referring now to FIG. 2, there is shown alternative exemplary apparatus generally designated by the reference character 200 for implementing methods for washing plastics contaminated with polychlorinated biphenyls (PCBs) is provided to reduce the concentration of the PCBs in accordance with another preferred embodiment. Apparatus 200 similarly includes a washing stage 202 receiving mixed plastics/polymers contaminated with PCBs 204, for example, from a shedder, froth flotation process, or storage bin. A washing solution or solvent 206 is used in the first washing stage 202 to provide effective removal of oils, grease and dirt, for example, using a selected solvent washing solution such as, $H_2O_2$ or a solvent such as, Perchloroethylene or hexane, or other solvent.

Apparatus 200 includes a second desorption stage 210 receiving the washed plastics from the first washing stage 202. A temperature control 212 provided with the second thermal desorption stage 210 provides a predefined temperature below the temperature that may cause degradation of the properties of the material being cleaned for the desorption process. An inert gas supply 214 is provided with the second desorption stage 210 providing an inert gas environment advantageously used to prevent oxidation and to facilitate removal of the desorbing gases and vapors. Steam optionally can also be used and is selectively applied by a steam generator 216.

In accordance with features of the invention, an OUTPUT of the apparatus 100 of FIG. 1 and of the apparatus 200 of FIG. 2 provides a final product having residual PCBs of less than 2 PPM. Thus, achieving a primary aspect of this process to clean the plastics so that they can be introduced into commerce, i.e. their PCBs content less than 2 PPM. Additional benefits include increasing the concentration of the desired plastics in the final product by dissolving some of the other plastics in the product. The dissolved plastics can also be recovered as a product. This makes the overall process more efficient and most likely more economical. Even though Perc has been used in this process to clean the plastics and selectively recover the PS and the PPO, other solvents may be used to clean the plastics and selectively recover-other plastics. Therefore, this invention is not limited to Perc. This process can also be applied for cleaning and purifying products produced by various techniques such as froth flotation. For example, the ABS product from shredder residue and home appliances may contain about 1%-10% by weight PS and PPO. This process can clean and separate the PS from the ABS to produce essentially 100% pure ABS and PS products.

Experimental Results

We conducted experiments to check the two-step concept. Perc was selected because it is not flammable. Other solvents such as hexane could also be used. Three sets of experiments were performed: 1. Washing with Perc only 2. Thermal desorption only; and 3. Washing with Perc followed by thermal desorption.

Washing with Perc only. Mixtures of polypropylene and polyethylene recovered from shredder residue that contained between 4%-8% rubber and other synthetic polymers and wood were washed using Perc at different temperatures and different residence times. About 5 ml of Perc were used per gram of plastics washed. The results are shown in Table 1. The results of the room temperature tests showed that about ⅓ of the PCBs were removed in the first few minutes. However, about 15% remained after one hour of washing. Absorption of small amount of the Perc occurred during the 60 minute test.

Polystyrene and PPO were also dissolved at 10, 30 and 60 minutes. Some dissolution also occurred at 5 minutes. At 50° C. about 78% of the PCBs were removed in 10 minutes and about 94% were removed in 60 minutes. Absorption of Perc into the plastics was significant at 60 minutes and some occurred at 10 minutes. Polystyrene and PPO were dissolved at both residence times.

TABLE 1

Results of Batch Washing of Polypropylene and Polyethylene Recovered from Shredder residue using Perc. (Washed samples were rinsed with fresh Perc)

| Sample Number | Temperature, °C. | Residence Time, minutes | Starting PCBs Conc., PPM | Ending Conc., PPM |
|---|---|---|---|---|
| 1 | Room Temp. | 5 | 29.90 | 10.45 |
| 2 | Room Temp | 10 | 29.90 | 11.22 |
| 3 | Room Temp. | 30 | 29.90 | 10.02 |
| 4 | Room Temp | 60 | 29.90 | 4.419 |
| 5 | 50 | 10 | 22.72 | 7.42 |
| 6 | 50 | 60 | 29.90 | 2.075 |
| 7 | 100 | 5 | 29.90 | 2.726 |
| 8 | 100 | 30 | 29.90 | 3.479 |
| 9 | 100 | 30 | 29.90 | 4.429 |

At 100° C. even the polyolefins started to soften and stick together and dissolve at 30 minutes. Significant absorption of Perc also occurred at 30 minutes. This is suspected to be the reason for the increase in the PCBs concentration at 30 minutes and 60 minutes compare to the value at 5 minutes.

Thermal Desorption Only. The second set of experiments was conducted using thermal desorption only. The results are given in Table 2. The results showed that even after one hour of exposure about 15%-20% of the PCBs remained on the plastics. Stripping with steam at elevated temperatures will also reduce the PCBs. We plan to conduct tests using superheated steam.

TABLE 2

Results of Thermal Desorption of Polypropylene and Polyethylene Recovered from Shredder residue at 250° C. for 1 hour

| Sample Number | Starting PCBs Conc., PPM | Ending Conc., PPM | Atmosphere |
|---|---|---|---|
| 1 | 29.90 | 5.62 | Air Flow |
| 2 | 29.90 | 4.39 | Nitrogen Flow |
| 3 | 29.90 | 12.7 | Vacuum |

Perc Washing Followed by Thermal Desorption. The third set of experiments was conducted using washing in Perc followed by thermal desorption. When Thermal desorption was conducted at 150° C. and 200° C. after washing in Perc very little reduction in PCBs was observed. At 250° C. the PCBs concentration was consistently below 2 PPM. The results are given in Table 3.

These results establish the technical feasibility of the two-step process. The temperatures and residence times used in each of the two steps depend on the washing solution or solvent used and on the type of plastics that are being cleaned. Thermal treatment times shorter than 30 minutes will be tested.

TABLE 3

Results of Washing Polypropylene and Polyethylene Plastics in Perc at 50° C. for 10 minutes Followed by Thermal Desorption at 250° C.

| Sample Number | Starting PCBs Conc., PPM | Thermal Treatment Resident Time, min. | Final PCBs Conc., PPM |
|---|---|---|---|
| 1 | 22.72 | 30 | 0.422 |
| 2 | 22.72 | 30 | 0.253 |
| 3 | 22.72 | 45 | 1.026 |
| 4 | 22.72 | 60 | 1.23 |
| 5 | 22.72 | 60 | 0.383 |

Tests using solutions other than Perc were conducted. These solutions include: 3% and 6% $H_2O_2$ solutions; and EZ Deco®.EZ Decon is commercially available solution containing 2-Butoxyethanol, sodium metasilcate, sodium hydroxide, and complex substituted keto-amine. None of these solutions gave results as good as the two step process. The treatment with $H_2O_2$ and the other solvents and solutions reduce the concentration of the PCBs. For example when H2O2 was used the concentration of the PCBs was reduced by about 54% after 15 minutes using about 8 ml of solution per gram of plastics. Other solvents and/or solutions could be used instead of the Perc. In all cases thermal desorption of the residual PCBs will be a more efficient and economical way to achieve the less than 2 PPM in the final product after washing the plastics in an appropriate solution or solvent to remove the oils, grease and dirt that coat the plastics.

While the present invention has been described with reference to the details of the embodiments of the invention shown in the drawing, these details are not intended to limit the scope of the invention as claimed in the appended claims.

What is claimed is:

1. A process of washing plastics contaminated with polychlorinated biphenyls (PCBs) to reduce the concentration of the PCBs comprising:

performing a first washing step using a selected washing solution or solvent for providing washed plastics; said first washing step being provided at ambient pressure, and being provided for a selected time period based upon types and levels of contamination on the plastics being cleaned; and said first washing step providing effective removal of oils, grease and dirt, and PCBs present in the oils, grease and dirt, and performing a second thermal desorption step for desorbing adsorbed PCBs from the washed plastics; said second thermal desorption step being provided at a predefined temperature near approximately 250° C., said predefined temperature being provided below a temperature causing degradation of properties of a plastic material of the plastics being cleaned; and the concentration of the PCBs being reduced to less than 2 ppm.

2. A process of washing plastics as recited in claim 1, wherein using a selected washing solution or solvent includes using a washing solution of $H_2O_2$.

3. A process of washing plastics as recited in claim 1, wherein using a selected washing solution or solvent includes using a solvent Perchloroethylene.

4. A process of washing plastics as recited in claim 1, wherein using a selected washing solution or solvent includes using a solvent hexane.

5. A process of washing plastics as recited in claim 1, wherein using a selected washing solution or solvent includes using a selected non-flammable solvent.

6. A process of washing plastics as recited in claim 1, wherein performing a first washing step includes providing a residence time of plastics in the first washing step between about 5 minutes to about 60 minutes.

7. A process of washing plastics as recited in claim 1, wherein performing a second thermal desorption step includes providing a predefined temperature under vacuum.

8. A process of washing plastics as recited in claim 7, further comprising providing said predefined temperature for a selected time period in a range between about 15 minutes and about 60 minutes.

9. A process of washing plastics as recited in claim 7, further comprising providing said predefined temperature below a temperature of about 250° C.

10. A process of washing plastics as recited in claim 1, wherein performing a second thermal desorption step includes providing a predefined temperature in an inert gas environment.

11. A process of washing plastics as recited in claim 1, wherein performing a second thermal desorption step includes providing a predefined temperature with steam.

12. A process of washing plastics as recited in claim 1, wherein performing a second thermal desorption step includes providing a predefined temperature with superheated steam.

13. Apparatus for washing plastics contaminated with polychlorinated biphenyls (PCBS) to reduce the concentration of the PCBs comprising:
a first washing stage receiving the plastics and providing washed plastics using a selected washing solution or solvent; and said first washing stage being provided at ambient pressure, and being provided for a selected time period based upon types and levels of contamination on the plastics being cleaned; and said first washing stage providing effective removal of oils, grease and dirt, and PCBs present in the oils, grease and dirt, and
a second thermal desorption stage recieving the washed plastics and desorbing and absorbed PCBs from the washed plastics; said second thermal desorption stage being provided at a predefined temperature near approximately 250° C., said predefined temperature being below a temperature causing degradation of properties of a plastic material of the plastics being cleaned; and concentration of the PCBs being reduced to less than 2 ppm.

14. Apparatus for washing plastics as recited in claim 13, wherein said selected washing solution or solvent includes a washing solution of $H_2O_2$.

15. Apparatus for washing plastics as recited in claim 13, wherein said selected solvent includes a hexane.

16. Apparatus for washing plastics as recited in claim 13, wherein said selected solvent includes a Perchloroethylene.

17. Apparatus for washing plastics as recited in claim 13, wherein said second thermal desorption stage includes a temperature control providing a said predefined temperature for a selected time period in a range between about 15 minutes and about 60 minutes.

18. Apparatus for washing plastics as recited in claim 17, wherein said second thermal desorption stage includes a vacuum pump providing a vacuum.

19. Apparatus for washing plastics as recited in claim 17, wherein said second thermal desorption stage includes an inert gas providing an inert gas environment.

20. Apparatus for washing plastics as recited in claim 17, wherein said second thermal desorption stage includes a steam generator providing steam.

* * * * *